US010140531B2

(12) United States Patent
Alrefai et al.

(10) Patent No.: US 10,140,531 B2
(45) Date of Patent: Nov. 27, 2018

(54) DETECTION OF BRAKE LIGHTS OF PRECEDING VEHICLES FOR ADAPTATION OF AN INITIATION OF ACTIVE SAFETY MECHANISMS

(71) Applicant: Conti Temic microelectronic GmbH, Nürnberg (DE)

(72) Inventors: Muhammad Alrefai, Lauffen am Neckar (DE); Mihai Baneu, Lindau (DE); Guido Fuchs, Carpinteria, CA (US); Mario Götz, Jettingen (DE); Yasir Mannisseri, Lindau (DE)

(73) Assignee: CONTI TEMIC MICROELECTRONIC GMBH, Nürnberg (DE)

( * ) Notice: Subject to any disclaimer, the term of this patent is extended or adjusted under 35 U.S.C. 154(b) by 0 days.

(21) Appl. No.: 15/868,344

(22) Filed: Jan. 11, 2018

(65) Prior Publication Data

US 2018/0137380 A1    May 17, 2018

Related U.S. Application Data

(63) Continuation of application No. PCT/DE2016/200310, filed on Jul. 6, 2016.

(30) Foreign Application Priority Data

Jul. 13, 2015    (DE) .................. 10 2015 213 078

(51) Int. Cl.
*G06K 9/00* (2006.01)
*B60Q 9/00* (2006.01)
*B60T 7/22* (2006.01)

(52) U.S. Cl.
CPC ......... *G06K 9/00825* (2013.01); *B60Q 9/008* (2013.01); *B60T 7/22* (2013.01); *B60T 2201/022* (2013.01); *B60T 2210/32* (2013.01)

(58) Field of Classification Search
CPC . G06K 9/00825; B60T 7/22; B60T 2201/022; B60T 2210/32; B60Q 9/008
See application file for complete search history.

(56) References Cited

U.S. PATENT DOCUMENTS

| 7,365,769 | B1 | 4/2008 | Mager |
| 2012/0044066 | A1* | 2/2012 | Mauderer ................. B60T 7/22 340/479 |

(Continued)

FOREIGN PATENT DOCUMENTS

| DE | 102009025545 A1 | 12/2010 |
| EP | 1851681 A1 | 11/2007 |

(Continued)

OTHER PUBLICATIONS

Wei Liu et al; "Vision-Based Method for Forward Vehicle Brake Lights Recognition"; International Journal of Signal Processing, Image Processing and Pattern Recognition; Bd. 8, Nr. 6, Jun. 30, 2015, pp. 167-180, XP055270150, ISSN: 2005-4524, DOI: 10.14257/ijsip.2015.8.6.18.

(Continued)

*Primary Examiner* — Richard M Camby (57) ABSTRACT

A method and a device for determining a warning condition on the basis of brake light detection. Image data are received from a front camera of a vehicle. It is determined whether a brake light of a preceding vehicle is active. An initiation threshold is lowered or a confidence value is raised if the brake light is active. An estimated risk value is derived from the image data of the front camera and a warning signal is produced, if the estimated risk value exceeds the initiation threshold.

8 Claims, 3 Drawing Sheets

(56) References Cited

U.S. PATENT DOCUMENTS

2014/0379233 A1* 12/2014 Chundrlik, Jr. ......... B60T 8/171
                                                         701/70
2015/0123781 A1    5/2015 Mauderer et al.
2016/0110620 A1*   4/2016 Botusescu .......... G06K 9/00825
                                                        348/148

FOREIGN PATENT DOCUMENTS

WO    2006089498 A1    8/2006
WO    2014154213 A1   10/2014

OTHER PUBLICATIONS

International Search Report and Written Opinion dated Nov. 4, 2016 from corresponding International Patent Application No. PCT/DE2016/200310.
Search Report dated Jan. 22, 2016 for corresponding German Patent Application No. 10 2015 213 078.9.

* cited by examiner

DETECTION OF BRAKE LIGHTS OF PRECEDING VEHICLES FOR ADAPTATION OF AN INITIATION OF ACTIVE SAFETY MECHANISMS

This application claims the benefit of International application No. PCT/DE2016/200310, filed Jul. 7, 2016, which claims priority to German patent application No. 10 2015 213 078.9, filed Jul. 13, 2015, each of which is hereby incorporated by reference.

BACKGROUND

Various active safety systems are currently being used or explored, which assist a driver during a braking process or also with the decision of initiating the braking process. For example, a vehicle may autonomously decide to initiate an automatic emergency braking (AEB) or to modify the braking process. This decision is based on sensor data about the surroundings of the vehicle.

High-cost sensors such as, for example, radar sensors but also low-cost sensors such as, for example, an infrared short-range lidar are able to measure the position, distance and relative speed of a preceding vehicle and to derive an appropriate deceleration therefrom. These estimated values can be improved by using vehicle cameras or can be provided by the vehicle cameras.

The safety features of a vehicle can be categorized as passive and active safety features. Passive safety features include means for protecting the passengers from injuries or for reducing the risk of injuries. In a broader sense, passive safety also includes protecting other road users. Passive safety features include, inter alia, the safety belt system, airbags, passenger cell and crumple zones of the vehicle.

The active safety features include systems which actively intervene in the driving situation, in particular driver assistance systems such as the electronic stability program (ESP), braking assistance systems and driver assistance systems which are connected to surroundings monitoring devices such as, for example, cameras, radars, and lidars.

SUMMARY

The present specification relates to an active safety feature using a camera system or a camera system having data fusion. In particular, the initiation decision or an initiation sensitivity of active safety systems is adapted by optically detecting that the preceding vehicle is braking or is performing an emergency braking.

Image processing of vehicle camera images according to the present specification can improve an estimated value of an intended deceleration by providing a detection of a brake light status of a preceding vehicle. This information is used to help to gauge a collision risk for the adaptation of the initiation sensitivity of active safety functions.

As a result, a required deceleration can be gauged more precisely than by simply estimating absolute or relative dimensions of detected image objects of a camera image. Furthermore, a deceleration of a preceding vehicle can be provided more promptly and more accurately, and the estimate is better suited to gauging the collision risk.

In one embodiment, the camera images are evaluated and it is detected whether the brake lights of the preceding vehicle are activated or are being activated. Furthermore, an emergency braking is detected, which is indicated by the brake lights or brake lights and hazard flashing of the preceding vehicle, for example by a rapid flashing of the brake lights or a periodic flashing of the indicator lights on both sides of the vehicle (hazard flashing) in addition to activating the brake lights.

According to the present application, the brake light status of a vehicle which is driving in front of the present vehicle is used to derive a risk value or hazard value. The risk value may depend on a deceleration of the present vehicle in the longitudinal direction, for example for the detection of downhill driving, or on a combination with a camera-based plausibility estimate. The risk value may depend, inter alia, on the distance of the preceding vehicle at the moment of braking, or on an increase or decrease in the relative speed. Furthermore, the risk value may also depend on a prediction of a lane orientation or respectively a lane profile and of a lane width. An initiation sensitivity of an active safety system is adapted accordingly.

According to one embodiment, initiation thresholds such as, for example, a threshold for initiating a warning, a brake prefill, a hydraulic brake assistance (HBA) or an automatic emergency braking (AEB), are lowered in order to arrive at an initiation decision earlier.

According to one embodiment, the lowering of the thresholds is only carried out for a predetermined period of time which is started by a status transition from the status "brake lights off" to the status "brake lights on".

According to a further embodiment, the brake lights (and optionally, in addition, the hazard warning lights) of the present vehicle are controlled directly or indirectly if a high risk value is detected, as a function of the brake light of the preceding vehicle, in order to warn the traffic behind of a possible collision or collision avoidance braking. The controlling of the brake lights is initiated in addition to the weak initiation decision with respect to the warning, prefill, HBA, etc.

The option of controlling the brake lights can be activated or deactivated based on predetermined conditions. The predetermined conditions may be provided by pre-configured settings such as, for example, a pre-configured table. In particular, the option of controlling the brake lights may be activated for vehicles such as SUVs, minibuses or caravans, in the case of which the traffic behind may not be able to detect the third upper brake light of the preceding vehicle.

Furthermore, the pre-configured settings may depend on whether the traffic regulations in a sales region in which the vehicle is sold allow the brake lights to be controlled. In one embodiment, the warning lights are controlled one or multiple times instead, if controlling of the brake lights is deactivated based on the pre-configured settings.

According to a further embodiment, active safety mechanisms, such as a warning, a brake prefill or HBA, are activated and/or a confidence value of the object detection is raised if a result of the object detection is confirmed by a detection of the brake light status.

According to a further embodiment, emergency brake lights or warning lights are activated autonomously if an emergency braking of the preceding vehicle is detected. The autonomous activation may furthermore depend on the extent of the braking or deceleration of the present vehicle.

In one possible scenario, two top-of-the-range or mid-range vehicles, which are both equipped with brake lights that indicate an emergency braking by an increased flashing rate and/or by an increased brightness, are driving one behind the other. The preceding vehicle performs an emergency braking. If the driver in the vehicle behind responds in time and moderately, no activation of the active safety means is necessary. Nevertheless, the vehicle behind autonomously indicates an emergency braking to the traffic behind via the brake lights or the warning lights.

According to a further embodiment, sensor data are fused or merged and the automatic risk assessment is applied to the fused data. According to another embodiment, active and passive safety systems are integrated or combined and an image detection or a risk assessment according to the current specification is applied to active safety features and, if possible, also to passive safety features. For example, a threshold or an operating mode for initiating an airbag can be modified based on the risk assessment.

The current specification discloses, inter alia, a computer-implemented method for determining a warning condition on the basis of brake light detection of a car or vehicle driving in front of the present vehicle. If the warning condition is fulfilled, a warning signal is produced in order to initiate an active safety feature of the present car.

According to this method, image data are received from a front camera of a present vehicle either by means of a separate connection cable or via a suitable automotive data bus such as, for example, the MOST bus. In particular, MOST 150 is suitable for use by modern driver assistance systems.

The image data comprise image frames, which comprise pixels. The pixels may correspond to grayscale pixels but also, for example, to pixels that comprise intensity and color data. In particular, a brake light may be detected using an intensity in the red color range.

A detection area is identified in the image frames of the front camera. The detection area comprises a location of a left brake light and of a right brake light of a preceding vehicle. The detection area is identified with image detection and tracking. For example, the image detection can be based on the outer outline of the preceding vehicle or other characteristic features such as the license plate, the rear window or the rear lights.

Appropriate positions of the left brake light and of the right brake light are identified within the detection area. The detection of the brake light positions may involve techniques such as edge detection and tracking, intensity detection, or detection of an intensity in a predefined color range.

Furthermore, it is determined whether the left brake light, the right brake light, or both is/are active by evaluating an intensity distribution in the detection area. This may also include tracking the brake light intensity over time, for example in order to detect a warning mode in which the intensity of the brake light changes periodically. In a further embodiment, time intervals of the changing intensity are determined. For example, the detection may include detecting whether the brake light flashes faster. By way of example, the flashing may indicate an emergency condition or that a warning is "forwarded" from another vehicle.

According to a first aspect, an initiation threshold is lowered if it is determined that at least one of the left or right brake lights of the preceding vehicle is active, and an estimated risk value is derived from at least the image data of the front camera.

Other sensor data, such as radar and lidar data, etc. may also be used to derive the estimated risk value, if said data are available within the framework of a sensor data fusion. By only using the image data, an inexpensive solution can be provided, which is simple to implement. In particular, a premium vehicle camera with high-quality, high-resolution mono-vision images may be sufficient to derive the estimated risk value.

The at least one estimated risk value is derived from the image data of the front camera and, optionally, also from other measurements. In particular embodiments, the estimated risk value is derived from at least one value consisting of a distance from the preceding vehicle, a relative or absolute speed of the preceding vehicle, and a relative or absolute deceleration of the preceding vehicle, or from a combination thereof. A warning signal is initiated, if the estimated risk value exceeds the trigger threshold.

The absolute speed and deceleration of the preceding vehicle may be determined by using the camera ego-motion, which is determined by means of the image data and, indeed, using the speed relative to the ground or other stationary objects as reference or also by using other sensor data such as, for example, speedometer data.

According to a second aspect, a confidence value which relates to one or more estimated risk values is raised, if it is detected that a brake light of the preceding vehicle is active. In one embodiment, the confidence value assumes values between 0 and 100% and is an indication of a statistical probability that a given measurement or a combination of such measurements is correct. In particular, the measurement may refer to a distance from the preceding vehicle, a relative or absolute speed of the preceding vehicle, and a relative or absolute deceleration of the preceding vehicle, or a combination thereof. A warning signal is produced, if estimated risk value exceeds the initiation threshold.

In another embodiment, the confidence value is linked to a confidence interval around a measurement. In this context, the increase in the confidence value relates to a reduction in the confidence interval by a predefined factor. A warning signal is produced, if the confidence value exceeds a predefined confidence threshold.

According to further embodiments, the initiation threshold depends on a type of the present vehicle, on the operability of the present vehicle such as, for example, brake functionality, tire grip, tire pressure, and on the loading of the present vehicle.

The first and second aspect of the method can also be combined, for example by producing the warning signal if the initiation threshold and the confidence threshold are both exceeded. Furthermore, the features indicated below can be combined with the first and/or with the second aspect.

According to a further embodiment example, an active safety function is activated, if an estimated risk value exceeds the initiation threshold and/or if the confidence value exceeds the confidence threshold. The active safety function is selected from a collision warning, a brake prefill, a hydraulic brake assistance and an active emergency braking, or from a combination thereof.

According to a further embodiment, a second detection area is determined in the image frames of the front camera. The second detection area comprises a position of the upper brake light of the preceding vehicle. A position of the upper brake light is detected within the second detection area and a status of the upper brake light is detected. The initiation threshold is lowered and/or the confidence value is raised if it is detected that the upper brake light is activated.

According to a further embodiment example, a speed signal is received from a vehicle speed sensor of the present vehicle such as, for example, a wheel speed sensor, and the estimated risk value is derived from the image data of the front camera and from the speed signal of the speed sensor.

According to another embodiment, the intensity of one of the detected brake lights is analyzed. Furthermore, it is detected whether a warning brake light function is activated, for example by reading out a setting from a computer memory. If it is detected that the warning brake light function is activated, a brake light of the present vehicle is placed in a warning mode, if the estimated risk value exceeds a second initiation threshold, wherein the second initiation threshold is higher than the first initiation threshold.

According to a further embodiment example, a geographical region of the present vehicle is detected and the warning brake light function is activated or deactivated depending on the detected geographical region, for example by using a satellite positioning system such as GPS, a stored map, motion and acceleration sensors, or position determination via a wireless network.

According to a further embodiment, it is determined whether at least one brake light of the preceding vehicle, in particular an upper brake light, is active and it is determined whether the active brake light is currently operating in an emergency braking mode. A condition for activating a warning or an emergency brake light mode of the present vehicle is checked.

If the condition for activating the warning brake light mode is fulfilled, a brake light of the present vehicle is placed into a warning or emergency braking mode. The warning mode is maintained for a predefined time or for as long as the condition is fulfilled. The activation condition may be tested repeatedly. If it is detected that the active brake light of the preceding vehicle is no longer operating in emergency braking mode, the brake light mode of the present vehicle is switched back to normal.

Furthermore, the present specification discloses a computer program product for executing the steps of the aforementioned method.

Moreover, the present specification discloses a controller for the activation of automotive safety features, wherein the automotive safety features comprise at least one active safety feature.

The controller comprises an input connection for receiving image data of a front camera of a present vehicle and an output connection for outputting a warning signal.

The controller is configured to execute a method for determining a warning condition, for example by providing suitable circuitry such as, for example, a microcontroller, an ASIC or another integrated circuit, and one or more computer-readable memory units connected thereto and a connection to a power supply of the present car, wherein the computer-readable memory comprises computer-readable instructions.

In particular, the controller is configured to receive image data from a front camera of the present vehicle via the input connection, wherein the image data contain image frames. The controller determines a detection area in the image frames of the front camera, wherein the detection area includes a position of a left brake light and of a right brake light of a preceding vehicle.

Furthermore, the controller estimates appropriate positions of the left brake light and of the right brake light within the detection area and determines whether at least one of the left brake light and the right brake light is active by evaluating an intensity distribution of the appropriate image pixels in the detection area.

The controller lowers or decreases an initiation threshold if it is established that at least one of the left brake light and the right brake light of the preceding vehicle is active. The controller furthermore derives an estimated risk value from the image data of the front camera and from other sensor data such as radar and lidar, etc., if available.

In a specific embodiment, the estimated risk value is derived from at least one of a distance from the preceding vehicle, a relative speed of the preceding vehicle and a deceleration of the preceding vehicle, or from a combination thereof.

Furthermore, the present specification discloses a kit with a controller and a front camera for a vehicle, wherein the front camera is connectable to the controller, either directly or via an automotive data bus.

Moreover, the present specification discloses a vehicle with the kit, wherein the front camera is mounted on the vehicle and faces towards an area in front of the vehicle, and wherein the controller is installed in the vehicle and is connected directly or indirectly to the front camera.

Furthermore, the present specification discloses a controller for the activation of automotive safety features according to a second aspect, which involves the raising of a confidence value in response to a brake light detection, and wherein the automotive safety features include at least one active safety feature.

The controller according to the second aspect comprises an input connection for receiving image data of a front camera of a present vehicle and an output connection for outputting a warning signal.

The controller is configured to execute a method for determining a warning condition, for example by providing suitable circuitry such as, for example, a microcontroller, an ASIC or another integrated circuit, and one or more computer-readable memory units connected thereto and a connection to a power supply of the present car, wherein the computer-readable memory contains computer-readable instructions.

In particular, the controller is configured to receive image data from a front camera of a present vehicle via the input connection, wherein image data comprise image frames. The controller determines a detection area in the image frames of the front camera, wherein the detection area comprises a position of a left brake light and of a right brake light of a preceding vehicle.

Furthermore, the controller estimates respective positions of the left brake light and of the right brake light within the detection area and determines whether at least one of the left brake light and the right brake light is active by evaluating an intensity distribution of appropriate image pixels in the detection area.

The controller raises a confidence value of at least one estimated risk value, which is derived from the image data of the front camera, initiates a warning signal, if the confidence value exceeds a predetermined confidence threshold and outputs the warning signal via the output connection.

Furthermore, the present specification discloses a kit with the controller and a front camera for a vehicle, wherein the front camera is connectable to the controller, either directly or via an automotive data bus.

Moreover, the present specification discloses a vehicle with the kit, wherein the front camera is mounted on the vehicle and faces towards an area in front of the vehicle, and wherein the controller is installed in the vehicle and is connected directly or indirectly to the front camera.

BRIEF DESCRIPTION OF THE FIGURES

The subject-matter of the present specification will now be explained in further detail with reference to the following figures, wherein.

DETAILED DESCRIPTION

In the following description, details are provided to describe the embodiment examples of the present specification. It should be apparent to the person skilled in the art, however, that the embodiments may also be realized without such details.

Figure 1:
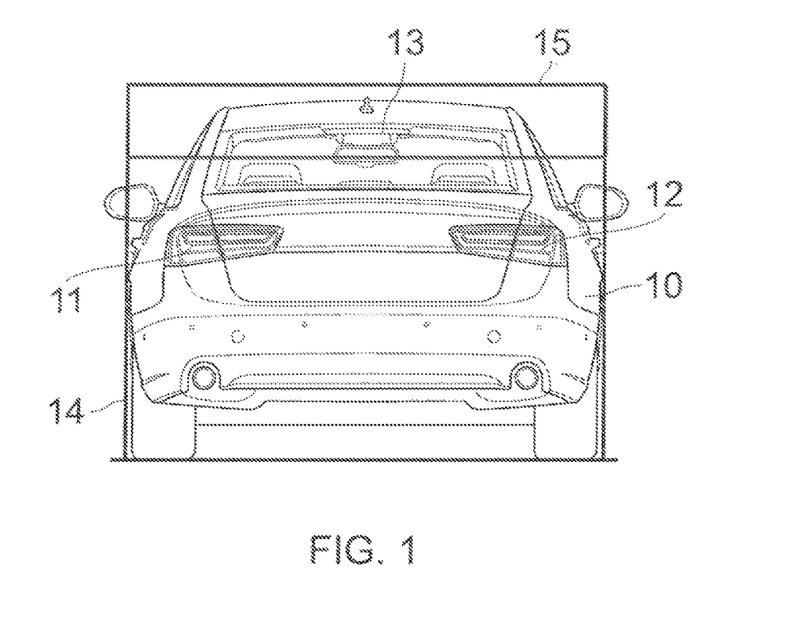
FIG. 1 shows a detection of a car which is driving ahead of a present car.

FIG. 1 illustrates a detection of brake lights 11, 12, 13 of a preceding car 10. In the situation shown in FIG. 1, the car 10 ahead is aligned exactly parallel to the present car. A first rectangular detection area 14 comprises an area in which the lower two brake lights 11, 12 are likely to be found. A second rectangular detection area 15 comprises an area in which an upper brake light may be found, if present.

In the context of the present application, the car that comprises the brake light detection system according to the present specification and the vehicle camera, and which provides the images of the car ahead, is also referred to as the "present car" or the "present vehicle".

According to one example, the extent of the first rectangular detection area 14 is defined by predefined dimensions such as, for example, a dimension of 2 m width and 1.10 m height. According to another example, the width or both dimensions of the first rectangular detection area 14 is/are determined by an image detection procedure. According to a further example, an initial size of the first rectangular detection area 14 is provided, and the initial rectangular detection area 14 is adapted according to an image detection procedure.

The alignment of the first rectangular detection area 14 is provided by an image detection procedure. The image detection procedure may depend, inter alia, on a brightness of the scene, which varies during the course of the day and depends on the cloud cover, weather, scenery and surrounding buildings or tunnel illumination. Similarly, the dimensions of the second rectangular detection area 15 can be provided by predefined dimensions, for example a predefined dimension of 2 m by 50 cm, by an image detection or by a combination of both.

Figure 2:
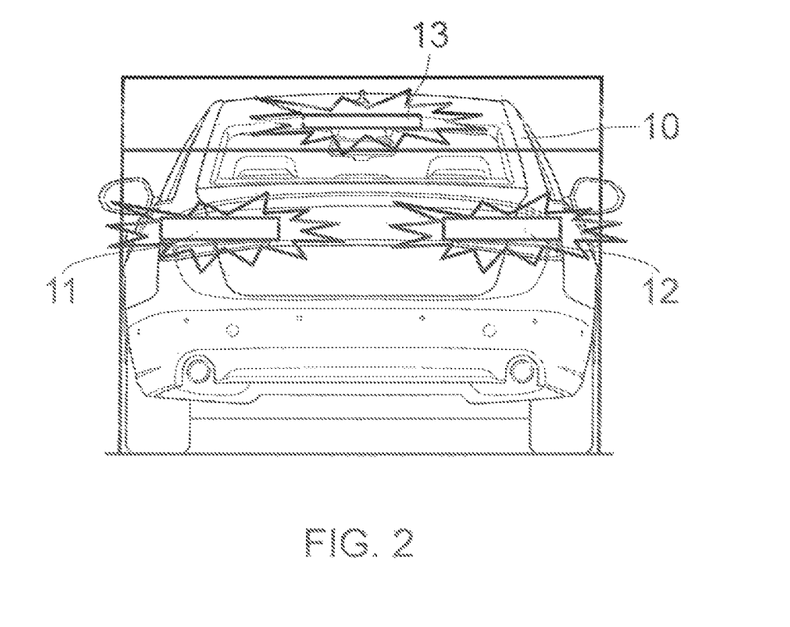
FIG. 2 shows a detection of brake light activation of the car of FIG. 1.

FIG. 2 illustrates an activated status of the brake lights 11, 12, 13 of the preceding vehicle 10. In particular, the activated status can be detected based on a brightness threshold and/or on color detection. The absolute brightness of the received light depends on various factors such as the distance and alignment of the preceding car 10, the design and the working condition of the brake lights 11, 12, 13 and the ambient conditions. For example, fog, smog and rain may affect the visibility of the brake lights 11, 12, 13.

Furthermore, the received light intensity also depends on the camera parameters, the working condition of the vehicle camera that receives the light, and on the condition of any objects in front of it such as, for example, a windscreen. According to one embodiment example, the image processing unit estimates the aforementioned factors and adapts the brightness threshold and/or the color threshold accordingly.

According to a further example, the image processing unit detects a relative change in brightness or color of camera image frames. The image processing unit may identify brake light areas in the detection areas 14, 15 and assign a higher weight to the identified brake light areas, or limit the detection of absolute or relative brightness or color to the identified brake light areas.

Figure 3:
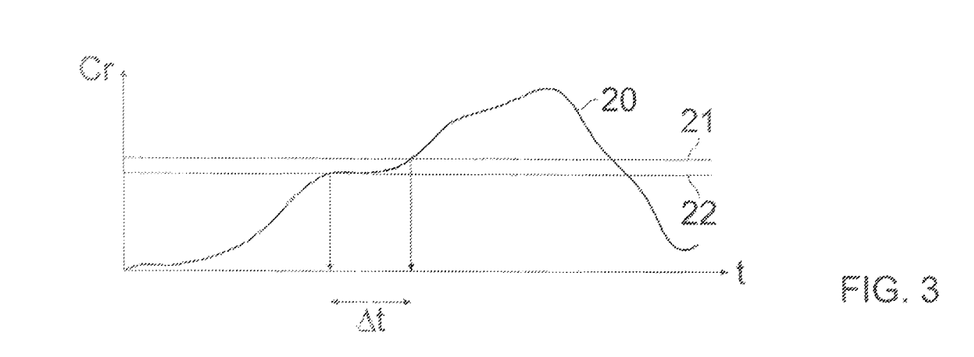
FIG. 3 illustrates an adaptation of a threshold in response to the detection of the brake light activation.

FIG. 3 shows a variation 20 of a criticality measure Cr over a time t, a first threshold 21 or upper threshold 21 and a second threshold 22 or lower threshold 22. The first threshold 21 is used for an automatic risk assessment without the use of a brake light detection according to the present specification. The second threshold 22 is used for an automatic risk assessment, which makes use of a brake light detection according to the present specification.

By using the brake light detection, an appropriate action can be initiated already if the lower threshold 22 is exceeded and, consequently, at a time $\Delta t$ before the upper threshold 21 is exceeded. As an example, the criticality measure Cr may be derived from a distance and a relative deceleration of the preceding car 10 and from a speed of the present vehicle.

Figure 4:
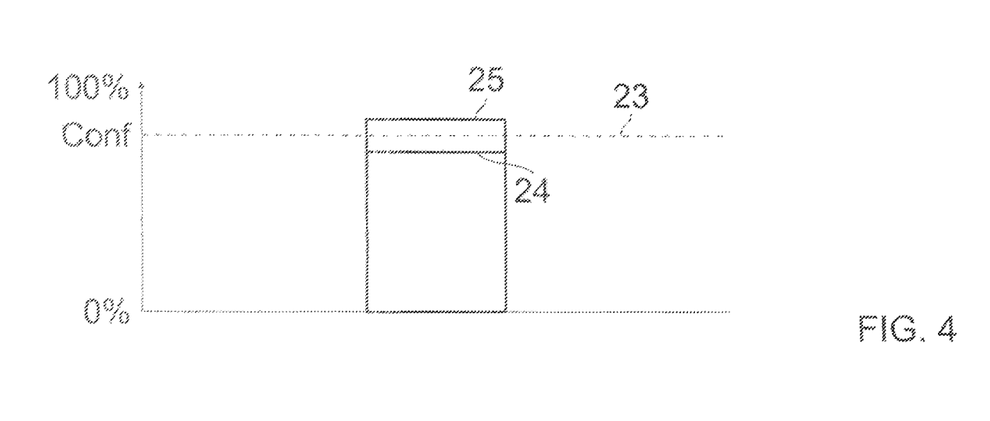
FIG. 4 illustrates an adaptation of a confidence value in response to a detection of a brake light activation.

FIG. 4 illustrates an increase in a confidence value or measure "Conf" as a consequence of a brake light detection according to the present specification. A dashed line 23 indicates a confidence threshold 23. The confidence threshold 23 must be exceeded in order to trigger a safety mechanism. In the example of FIG. 4, a confidence value 24 according to the smaller rectangle corresponds to a method using image detection but no brake light status detection, while the confidence value 25 according to the larger rectangle corresponds to a method using image detection and a brake light status detection according to the present specification.

According to one example, the confidence value is raised by a predefined amount such as, for example, 5% if a brake light activation is detected.

Figure 5:
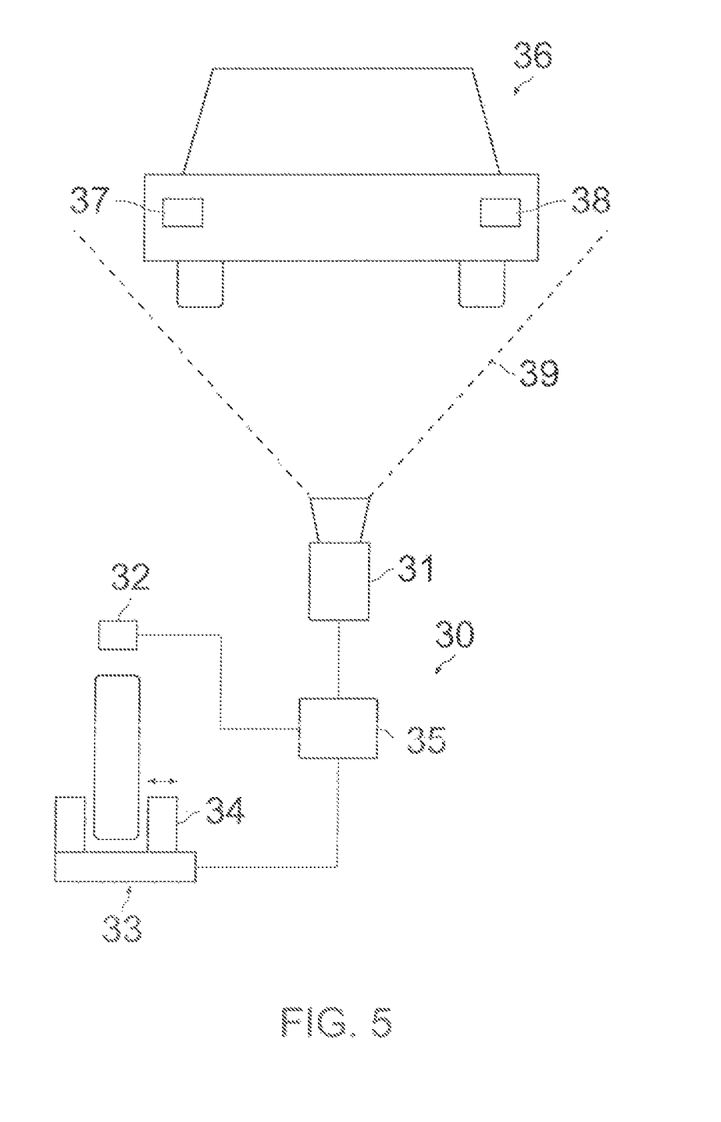
FIG. 5 shows a control system for an active safety feature of the present car.

FIG. 5 shows, by way of example, a control system 30 of a present vehicle which is not shown in FIG. 5. The control system 30 comprises a front camera 31, a wheel speed sensor 32 and a front brake 33 of the present car and a controller 35. The front camera 31, the wheel speed sensor 32 and the front brake 33 are connected to the controller 35.

The controller 30 controls a brake shoe 34 of the front brake 33 such that the brake shoe 34 can be moved between an open position and a prefill position. The movement of the brake shoe 34 is indicated by a double arrow. The front brake 33 acts on a brake disk, which is not shown in FIG. 5 for the sake of simplicity.

A preceding vehicle 36 with brake lights 37, 38 is arranged within a camera angle 39 of the front camera 31. During operation, the front camera 31 delivers image frames which contain an image of the preceding vehicle 36.

What is claimed is:

1. A method for determining a warning condition on the basis of brake light detection, the method comprising:
   receiving image data from a front camera of a present vehicle, the image data comprising image frames;
   determining a first detection area in the image frames of the front camera, the first detection area comprising a position of a left brake light and of a right brake light of a preceding vehicle;
   determining positions of the left brake light and of the right brake light within the detection area;
   determining whether at least one of the left brake light and the right brake light is active by evaluating an intensity distribution in the detection area;
   lowering a first initiation threshold, if it is established that at least one of the left brake light and the right brake light of the preceding vehicle is active;

determining a second detection area in the image frames of the front camera, the second detection area comprising a position of an upper brake light of the preceding vehicle;
detecting the position of the upper brake light within the second detection area;
detecting a status of the upper brake light;
lowering the first initiation threshold if it is detected that the upper brake light is activated;
deriving an estimated risk value from the image data of the front camera wherein the estimated risk value is derived from a distance from the preceding vehicle, a relative speed of the preceding vehicle and deceleration of the preceding vehicle; and
if the estimated risk value exceeds the first initiation threshold:
producing a warning signal; and
initiating an active safety function, the active safety function being selected from a collision warning, a brake prefill, a hydraulic brake assistance and an active emergency braking.

2. The method of claim 1, further comprising:
receiving a speed signal from a vehicle speed sensor of the present vehicle; and
deriving an estimated risk value from the image data of the front camera and the speed signal.

3. The method of claim 2, further comprising:
determining whether a warning brake light function is activated, and
if the warning braking function is activated, setting a brake light of the present vehicle to a warning mode;
if the estimated risk value exceeds a second initiation threshold, wherein the second initiation threshold is higher than the first initiation threshold.

4. The method of claim 3, further comprising:
detecting a geographical region of the present vehicle and activating or deactivating the warning brake light function depending on the detected geographical region.

5. A method for determining a warning condition on the basis of brake light detection, the method comprising:
receiving image data from a front camera of a present vehicle, the image data comprising image frames;
determining a first detection area in the image frames of the front camera, the first detection area comprising a position of a left brake light and of a right brake light of a preceding vehicle;
estimating respective positions of the left brake light and of the right brake light within the detection area;
determining whether at least one of the left brake light and the right brake light is active by evaluating an intensity distribution in the detection area;
if it is established that at least one of the left brake light and the right brake light of the preceding vehicle is active, raising a confidence value of at least one estimated risk value, the at least one estimated risk value being derived from the image data of the front camera;
determining a second detection area in the image frames of the front camera, the second detection area comprising a position of an upper brake light of the preceding vehicle;
detecting the position of the upper brake light within the second detection area;
detecting a status of the upper brake light;
raising the confidence value if it is detected that the upper brake light is activated; and
initiating a warning signal, if the confidence value exceeds a predetermined confidence threshold.

6. The method of claim 5, further comprising:
if it is established that at least one brake light of the preceding vehicle is active, the determining whether the at least one brake light is operating in a warning braking mode;
testing a condition for activating a warning brake light mode of the present vehicle; and
if the condition for activating the warning brake light mode is fulfilled,
placing a brake light of the present vehicle into a warning braking mode.

7. A controller for activating automotive safety features, the automotive safety features comprising at least one active safety feature, the controller comprising:
an input connection for receiving image data of a front camera of a present vehicle;
an output connection for outputting a warning signal, wherein the controller is configured to:
receive image data from the front camera, the image data comprising image frames;
determine a first detection area in the image frames of the front camera, the detection area comprising a position of a left brake light and of a right brake light of a preceding vehicle;
estimate respective positions of the left brake light and of the right brake light within the detection area;
determine whether at least one of the left brake light and the right brake light is active by evaluating an intensity distribution in the detection area;
lower an initiation threshold if it is established that at least one of the left brake light and the right brake light of the preceding vehicle is active;
determine a second detection area in the image frames of the front camera, the second detection area comprising a position of an upper brake light of the preceding vehicle;
detect the position of the upper brake light within the second detection area;
detect a status of the upper brake light;
lower the initiation threshold if it is detected that the upper brake light is activated;
derive an estimated risk value from the image data of the front camera, wherein the estimated risk value is derived from at least one of a distance from the preceding vehicle, a relative speed of the preceding vehicle, and a deceleration of the preceding vehicle, and
if the estimated risk value exceeds the initiation threshold:
produce a warning signal; and
output the warning signal via the output connection.

8. A controller for activating automotive safety features, the automotive safety features comprising at least one active safety feature, the controller comprising:
an input connection for receiving image data of a front camera;
an output connection for outputting a warning signal, the controller being configured to:
receive image data from a front camera of a present vehicle via the input connection, the image data comprising image frames;
determine a detection area in the image frames of the front camera, the detection area comprising a position of a left brake light and of a right brake light of a preceding vehicle;
estimate respective positions of the left brake light and of the right brake light within the detection area;

determine whether at least one of the left brake light and the right brake light is active by evaluating an intensity distribution in the detection area;

if it is established that at least one of the left brake light and the right brake light of the preceding vehicle is active, raise a confidence value of at least one estimated risk value, the at least one estimated risk value being derived from the image data of the front camera;

determine a second detection area in the image frames of the front camera, the second detection area comprising a position of an upper brake light of the preceding vehicle;

detect the position of the upper brake light within the second detection area;

detect a status of the upper brake light;

raise the confidence value if it is detected that the upper brake light is activated; and if the confidence value exceeds a predefined confidence threshold:

initiate a warning signal; and output the warning signal via the output connection.

* * * * *